May 9, 1967  J. V. GANZINOTTI  3,318,262
FLUID PROPULSION DEVICE
Filed Dec. 16, 1964  2 Sheets-Sheet 1
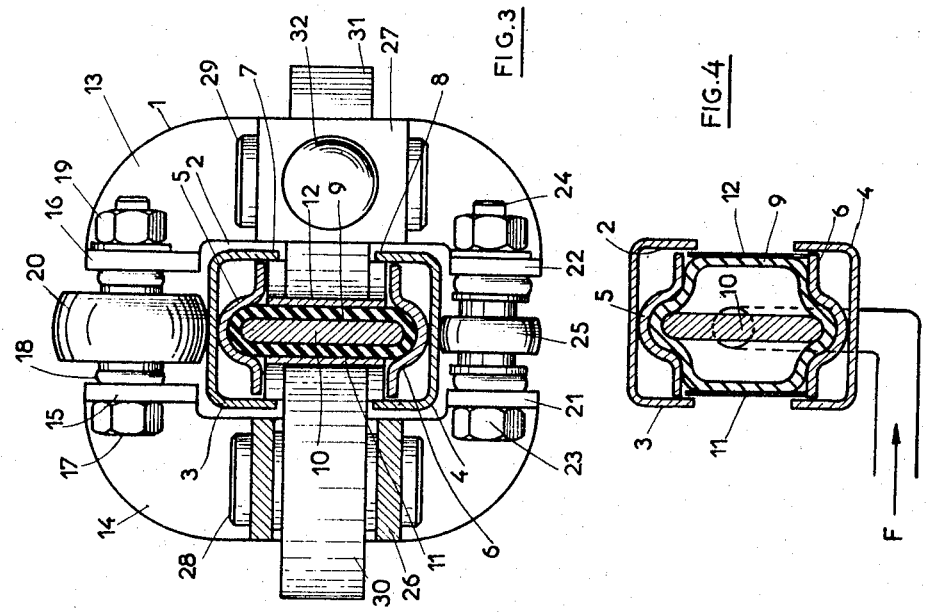
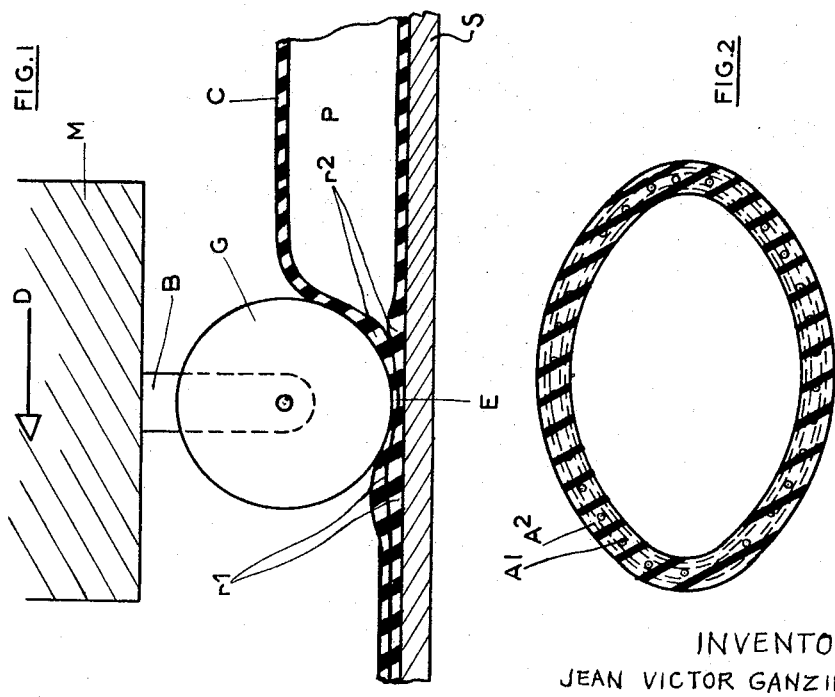
INVENTOR
JEAN VICTOR GANZINOTTI
By Hammond & Littell
ATTORNEYS

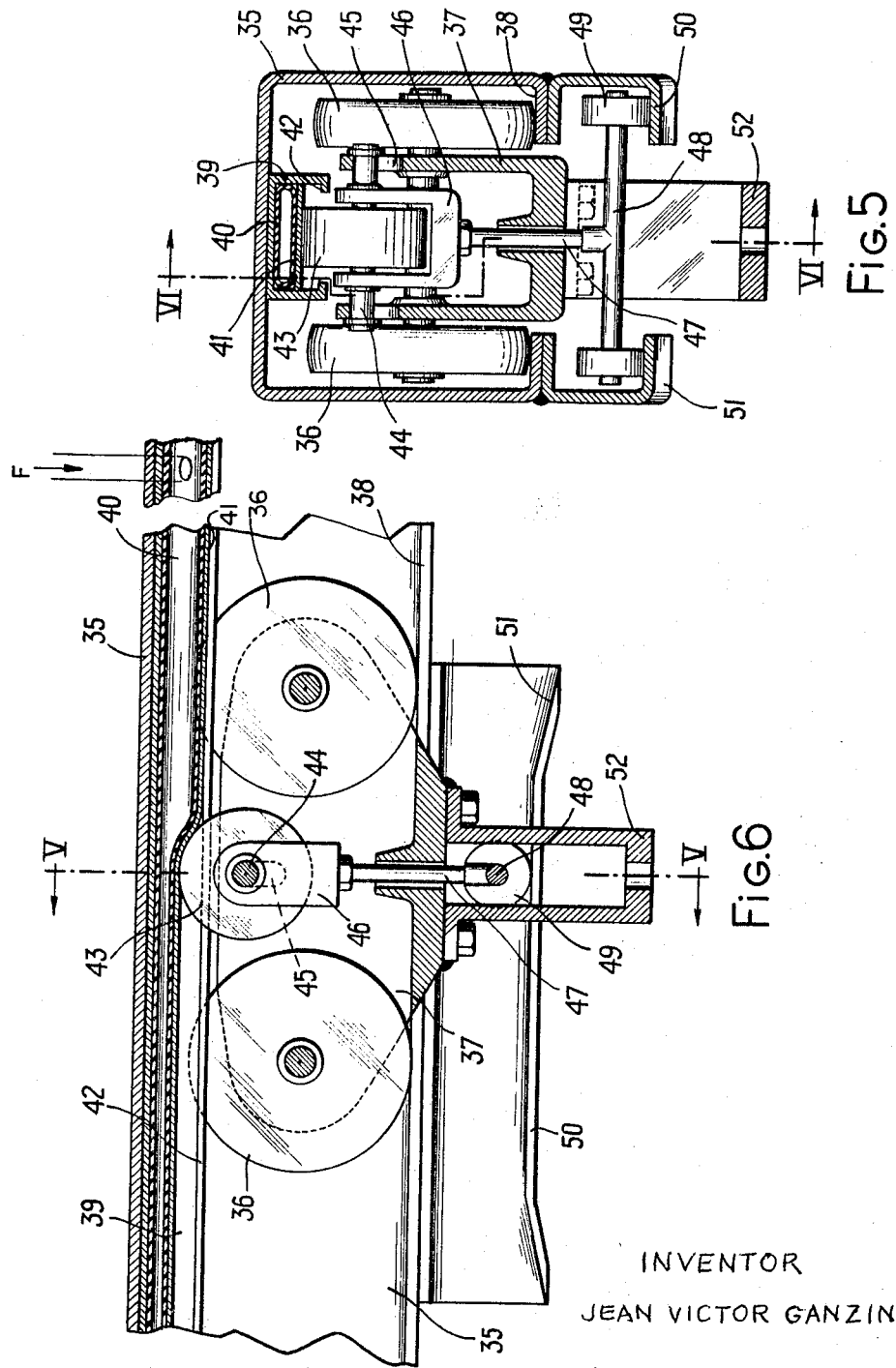

United States Patent Office 3,318,262
Patented May 9, 1967

3,318,262
FLUID PROPULSION DEVICE
Jean Victor Ganzinotti, Brive-Correze, France, assignor to Etablissements Maille et Vagneux, Paris, Seine, France, a company of France
Filed Dec. 16, 1964, Ser. No. 418,712
Claims priority, application France, Dec. 17, 1963, 957,425
2 Claims. (Cl. 104—155)

This invention relates to arrangements for actuating a moving body on a guide track by means of fluid under pressure.

The actuation of a moving body by fluid under pressure, whether a driving effect or a braking effect is involved, is generally obtained either by means of a fluid motor, or by means of a jack. In the case of a jack, for which the transmission is reduced to simple members, the travel is nevertheless limited to the possible displacement of the piston in the cylinder of the jack. In the case of a motor, the travel is not so strictly limited, but the transmission becomes complex, especially if the travel of the moving body comprises curved portions. Moreover, in such an eventuality, the use of a jack generally becomes impossible without the use of an equally complex transmission.

With the object of avoiding these drawbacks, an arrangement for actuating a moving body on a guide track by means of fluid under pressure has already been proposed, this arrangement principally comprising, on the said moving body, a roller or equivalent member, and on the said track, a conduit having a deformable wall, the said conduit being flattened by the said roller and receiving, on one side of the place where the flattening occurs, a fluid under a pressure higher than that prevailing on the other side.

Systems of this last type have various drawbacks, which have been an obstacle to the generalization of their use, in spite of the attractive aspects of the principle employed.

These drawbacks are essentially of three kinds:

On the one hand, no system has succeeded in completely eliminating the possibility of excessive deformations of and deterioration of the propelling conduit, in particular in case of accidental overpressure inside the conduit. These excessive deformations may cause fatigue of the conduit possibly resulting in the rupture thereof. Before the rupture of the conduit wear thereof may be manifested by the appearance of local swelling.

On the other hand, the roller or rollers flattening the conduit generally cause very localised deformation of the latter, this resulting in high tensions in the walls of the conduit and thereby causing very rapid deterioration;

Finally, the conduit is generally made of rubber, plastic materials or the like, whereas the roller or rollers are generally made of metal. The existence of a contact of the metal-to-rubber type, by increasing the extent of the area of contact increases the adhesion of the roller or rollers to the conduit and this is manifested by very poor conditions of relative displacement.

The invention will be further described with reference to the accompanying drawings, in which;

FIGURES 1 and 2 are detail views representative of the prior art, while the remaining views illustrate the invention, and in particular FIGURE 3 shows in section the combination of a driving or propelling carriage and a running track, FIGURE 4 is a section of the track when the propelling conduit is in the inflated state;

FIGURE 5 shows a variant in which a pinching roller is mounted movably in the carriage, the section of this figure being taken on the line V—V of FIGURE 6, which shows a section taken on the line VI—VI of FIG. 5.

FIGURE 1 is given by way of illustration of the drawbacks of prior art. It shows, in section, a system in which a moving body M on a track (not shown) is shifted in the direction D in the following manner; a substantially cylindrical roller G is rotatably mounted on an arm B fast with the moving body M. This roller G flattens locally at E a conduit C having deformable walls which is mounted on a support S parallel to the track and placed under excess pressure on one side of the zone of flattening. The existence of this excess pressure results in the shifting of the moving body M.

The local pressure of the roller G at E is necessarily rather strong. As shown, this pressure causes local deformation of the walls of the conduit in the form of bulges $r_1$ and $r_2$ appearing on the walls of the conduit C on either side of the point E, the area of contact E corresponding to an homologous reduction in thickness of walls of the conduit C. Of course, for clarity of the drawing, the sizes of the bulges $r_1$ and $r_2$ have been exaggerated.

Such an effect is particularly harmful in the case where the conduit is a rubberized conduit of the type shown in section in FIGURE 2, that is to say, provided with non-extensible longitudinal reinforcements such as $A_1$ and non-extensible transverse reinforcements such as $A_2$. Such non-extensible reinforcements are, however, practically indispensable, except for special arrangements as will be seen hereinafter, for preventing any excessive deformation of the conduit C. Under such conditions, the flattening effect tends to detach the reinforcements $A_1$ and $A_2$ from the rubbery material of the conduit, that is to say, it tends to cause a distinct deterioration of the latter.

Moreover, FIGURE 1 shows clearly that the contact between the roller G and the conduit C is a contact which takes place along an extensive area and this results in very high friction or braking effects; these effects are particularly harmful when the moving body M starts off.

The object of the present invention is to eliminate or substantially reduce these drawbacks.

More particularly, the present invention relates to an assembly for actuating by means of fluid under pressure a moving body displaceable on a guide track, comprising at least one conduit having deformable walls which is disposed along the track, at least one roller or the like mounted to rotate freely on the moving body and serving to cause the flattening of the conduit locally, and supply means for selectively supplying the conduit with fluid under pressure on one side or the other of the point of application of the roller on the conduit, characterized in that the conduit is surrounded by a rigid frame assembly fast with the track, the said frame assembly having at least one side open, this open side being closed by a longitudinally flexible strip mounted freely within the frame assembly, this strip serving as an intermediate member between the roller and the conduit and being moreover capable of co-operating with the frame assembly to form a casing and thus prevent any premature expansion of the conduit.

One embodiment of the invention shown in FIGURE 3 comprises a carriage designated generally by the reference 1 and a rail designated generally by the reference 2, the said carriage being mounted so that it is movable along the said rail, which is the track on which the carriage is shifted. This rail is constituted by two U-shaped sections 3, 4 disposed face to face. Inside the section 3 there is located another section 5 of omega shape, while the section 4 receives a section 6 symmetrical with the section 5. The flanges of the sections 5, 6 are located in planes disposed inside the sections 3, 4. Between the rounded portions of the sections 5, 6 there is disposed a conduit 9 of fluid-tight but deformable material, such as rubber, the conduit comprising a central core 10 applying two opposite wall sections of the conduit 9 against the heads or furthermost parts of the sections 5, 6. On both sides of the conduit 9 there are mounted two free thin strips 11, 12 of a material such as tempered steel which can be arrested by the lips 7, 8 of the sections 3, 4, these strips being thus relatively flexible longitudinally, but rigid transversely.

The assembly formed in this way supports a carriage 1 formed by means of two symmetrical stirrups 13, 14 on which bent lugs 15, 16 are joined by the spindle 17 formed by a bolt and spacers 18 and which is fixed by means of a nut 19 for the purpose of supporting by means of its inner collar or ring a roller 20 constituted by a ball bearing the outer race of which has a toroidal profile. This bearing 20 rides on the upper side of the section 3. At the bottom of the stirrups 13, 14 lugs 21, 22 are likewise provided between which there extends a bolt 23 retained by a nut 24 and serving as a spindle for an opposite guide roller 25 supported and formed like the roller 20, but engaging the section 4.

The stirrups 13, 14 comprise casings 26, 27 inside which there are mounted on spindles 28, 29 two cylindrical rollers 30, 31 which are also formed by ball bearings, the said rollers being at such a distance apart that they pinch or grip tightly between them, the assembly formed by the two strips 11, 12, the two subjacent walls of the tube 9 and the central core 10, this pinching action being effected in a fluid-tight manner so far as the intermediate fluid is concerned. The means for supplying fluid F, which are connected, for example, to the two ends of the conduit 9 one connection of which is indicated in FIG. 4, are of any appropriate type available to those skilled in the art and do not require to be described at length here.

In FIGURES 5 and 6, on the other hand, another operating factor is introduced. In this embodiment, a hollow rail 35 receives internally the two pairs of rollers 36 supporting a carriage 37, the rollers resting by their convex rims on the lower bent portions 38 of the lateral flanges of the rail.

Between two internal flanges 39 of the rail there is housed an expandable conduit 40 associated with an expansion-limiting strip 41, the latter being adapted to be retained by two inwardly turned rims 42 bordering each of the flanges 39. The fundamental function of the strip 41 is similar to that of the strips 11 and 12. Its material and structure are likewise identical.

The carriage 37 carries in its centre a pinching roller 43 adapted to be applied against the strip 41, thus pressing the strip 41 and the conduit 40 against the underside of the rail 35. The spindle 44 of the roller 43, guided in slots 45 in the sides of the carriage 37, is mounted on an inner yoke 46, the said yoke being fast with a push rod 47 at the end of which there is fixed a transverse spindle 48 carrying end rollers 49.

These rollers can co-operate with profiled ramps 50 fixed on both sides in the required positions below the section 35.

By means of inclined connected portions 51, the rollers 49 can act on the pinching roller 43 during the movement of the carriage 37, so as to apply the said roller against the conduit 40, keep it applied against the latter, or disengage it therefrom.

It is thus possible to produce actuating zones for the driving stage, for braking and for stopping for the carriage 37 on the rail 35. As before any appropriate means may be used for supplying fluid medium F under pressure to the propelling conduit as shown in FIG. 6.

Such displacing arrangements are applicable in general, whether it is a question of shifting operations, transport operations, handling operations and even for example the operation of doors.

In all cases, one and the same supply of fluid may be used for the actuation of a plurality of carriages in series, intermediate pockets in the expandable conduit co-operating in maintaining the spacing between the said carriages.

In the case of doors, with the arrangement shown in FIGURES 5 and 6, it is possible to provide a propulsion period for operation. This period corresponds to the supply of fluid to one of the ends of the expandable conduit. This propulsion period can be succeeded by a free running period. To this end, it is sufficient that the profile of the ramps 50 permit the production of a gap between the pinching roller 43 and the conduit 40 which, in these conditions, can inflate as far as the end remote from that by which it is supplied. This can be succeeded by a damping, braking and stopping period caused by action between the roller 43 and the underside of the section 35 as the said roller 43 itself approaches the end of the conduit 40 which is not being supplied with fluid under pressure, but which can be closed to a greater or lesser extent as required.

It is obvious that modifications can be made in the embodiments which have just been described without departing from the scope of the invention. Thus, in the case of FIGURE 3, the spindles 28 and 29 may be mounted in resilient bearings so as to produce a pinching action of increased efficiency on the walls of the conduit 9. Likewise, elements comprising springs or elastic rings may be combined with the embodiment of FIGURES 5 and 6 between the yoke 46 and the bottom of the carriage 37.

It is advantageous to use conduits 9 or 40 which are elastically deformable. Likewise, it is advantageous appropriately to lubricate the assembly at selected locations.

What is claimed is:

1. An arrangement for actuating a moving body displaceable on a guide track by means of a fluid under pressure, comprising a guide track, a moving body suspended therefrom, at least one flexible conduit having at least one deformable wall which is disposed along said track, at least one roller mounted to rotate freely and connected to said moving body supported by and suspended from said track so that its weight has no influence on said conduit and serving to cause flattening of said conduit locally, and supply means for selectively supplying said conduit with fluid under pressure to one side or the other of the point of application of said at least one roller on said conduit, wherein said conduit is surrounded by a rigid frame assembly, the upper portion thereof being solid and attached to said track, the said frame assembly having at least one side open and the open side being closed by a longitudinally flexible strip mounted freely within said frame assembly, the said strip serving as an intermediate member between the said at least one roller which runs on it and said conduit and being moreover capable of co-operating with said frame assembly to form a casing and thus prevent any excess expansion of said conduit.

2. An arrangement for actuating a moving body displaceable on a guide track by means of a fluid under pressure, comprising a guide track, a moveable body suspended therefrom, at least one flexible conduit having at least one deformable wall which is disposed along said track, at least one pair of pinching rollers mounted to rotate freely and connected to said moving body supported by and suspended from said track so that its weight has no influence on said conduit, said rollers being located on each side of the said deformable conduit and applied against the said conduit in such a manner as to prevent any flow of fluid along said conduit in either direction from the place where the pinching is effected, and supply means for selectively supplying said conduit with fluid under pressure to one side or the other of the point of pinching of said rollers on said conduit, wherein said conduit is surrounded by a rigid frame assembly, the upper portion thereof constituting a rail, the said frame assembly having two opposed open sides, each being closed by longitudinally flexible strips mounted freely within the frame assembly, said strips serving as intermediate members between the said rollers which run on it and said conduit and being moreover capable of co-operating with said frame assembly to form a casing and thus prevent any excess expansion of said conduit.

References Cited by the Examiner
UNITED STATES PATENTS
236,666  1/1881  Conger _____ 104—155

FOREIGN PATENTS
37,197  9/1886  Germany.

ARTHUR L. LA POINT, *Primary Examiner.*

J. E. BABER, *Assistant Examiner.*